US010841562B2

(12) United States Patent
Heidemann et al.

(10) Patent No.: US 10,841,562 B2
(45) Date of Patent: Nov. 17, 2020

(54) CALIBRATION PLATE AND METHOD FOR CALIBRATING A 3D MEASUREMENT DEVICE

(71) Applicant: FARO Technologies, Inc., Lake Mary, FL (US)

(72) Inventors: Rolf Heidemann, Stuttgart (DE); Gerrit Hillebrand, Waiblingen (DE)

(73) Assignee: FARO TECHNOLOGIES, INC., Lake Mary, FL (US)

(*) Notice: Subject to any disclaimer, the term of this patent is extended or adjusted under 35 U.S.C. 154(b) by 221 days.

(21) Appl. No.: 15/388,546

(22) Filed: Dec. 22, 2016

(65) Prior Publication Data

US 2017/0188015 A1 Jun. 29, 2017

(30) Foreign Application Priority Data

Dec. 27, 2015 (DE) .................. 10 2015 122 842

(51) Int. Cl.
*H04N 13/246* (2018.01)
*H04N 13/257* (2018.01)
*H04N 13/239* (2018.01)
*G01B 21/04* (2006.01)
*G01B 3/30* (2006.01)
(Continued)

(52) U.S. Cl.
CPC ............ *H04N 13/246* (2018.05); *G01B 3/30* (2013.01); *G01B 11/2504* (2013.01); *G01B 21/042* (2013.01); *G06T 7/521* (2017.01); *G06T 7/593* (2017.01); *G06T 7/85* (2017.01); *H04N 13/239* (2018.05); *H04N 13/257* (2018.05); *G06T 2200/04* (2013.01)

(58) Field of Classification Search
None
See application file for complete search history.

(56) References Cited

U.S. PATENT DOCUMENTS 5,978,081 A 11/1999 David et al.
6,826,299 B2* 11/2004 Brown ............... G01B 11/2545
345/419
(Continued)

FOREIGN PATENT DOCUMENTS

CN 104614385 A 5/2015
DE 19536297 A1 4/1997
(Continued)

OTHER PUBLICATIONS

Su et al.; "Aspheric and freeform surfaces metrology with software configurable optical test system: a computerized reverse Hartmann test"; Optical Engineering, vol. 53(3), 031305 (Mar. 2014) (Year: 2014).*

(Continued)

*Primary Examiner* — Christopher G Findley
(74) *Attorney, Agent, or Firm* — Cantor Colburn LLP

(57) ABSTRACT

A calibration plate and a method of calibrating a 3D measurement device is provided. The calibration plate includes a planar body having a surface. A plurality of marks are arranged on the surface. The plurality of marks being configured to be recorded by the camera and can be identified in the resulting recorded images during operation of the 3D measurement device. A mirror is positioned on the surface that reflects incident beams from the 3D measurement device.

17 Claims, 16 Drawing Sheets

(51) Int. Cl.
*G01B 11/25* (2006.01)
*G06T 7/521* (2017.01)
*G06T 7/80* (2017.01)
*G06T 7/593* (2017.01)

(56) References Cited

U.S. PATENT DOCUMENTS

| | | | |
|---|---|---|---|
| 8,238,611 B2 | 8/2012 | Hilaire et al. | |
| 2005/0134961 A1* | 6/2005 | Beisch | H04N 1/00002 359/518 |
| 2014/0125772 A1* | 5/2014 | Myokan | H04N 13/246 348/47 |
| 2015/0097931 A1 | 4/2015 | Hatzilias et al. | |
| 2015/0253137 A1* | 9/2015 | Jensen | G01C 25/00 356/4.01 |

FOREIGN PATENT DOCUMENTS

| | | |
|---|---|---|
| DE | 102007032471 A1 | 1/2009 |
| DE | 102007030378 A1 | 2/2009 |
| DE | 102009050604 A1 | 6/2010 |
| DE | 102012112322 A1 | 6/2014 |
| WO | 2015090553 A1 | 6/2015 |

OTHER PUBLICATIONS

German Office Action for Application No. 10 2015 122 842.4 dated Jun. 21, 2018; 5 pgs.
Great Britain Search Report for Application No. GB1622185.5 dated May 31, 2017; 4 pgs.
German Office Action dated May 9, 2016 for Application No. 10 2015 122 842.4; 5 pgs.

* cited by examiner

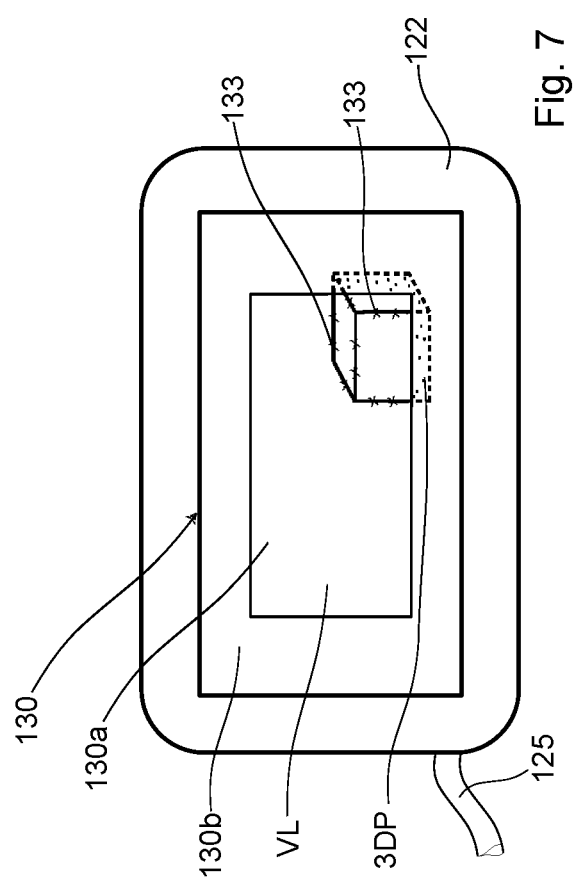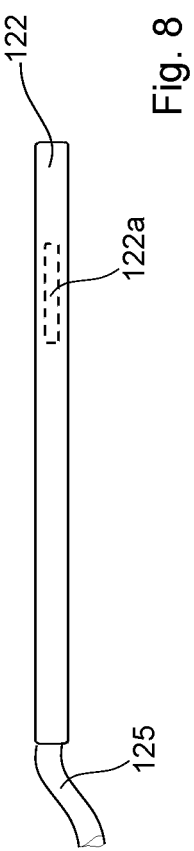

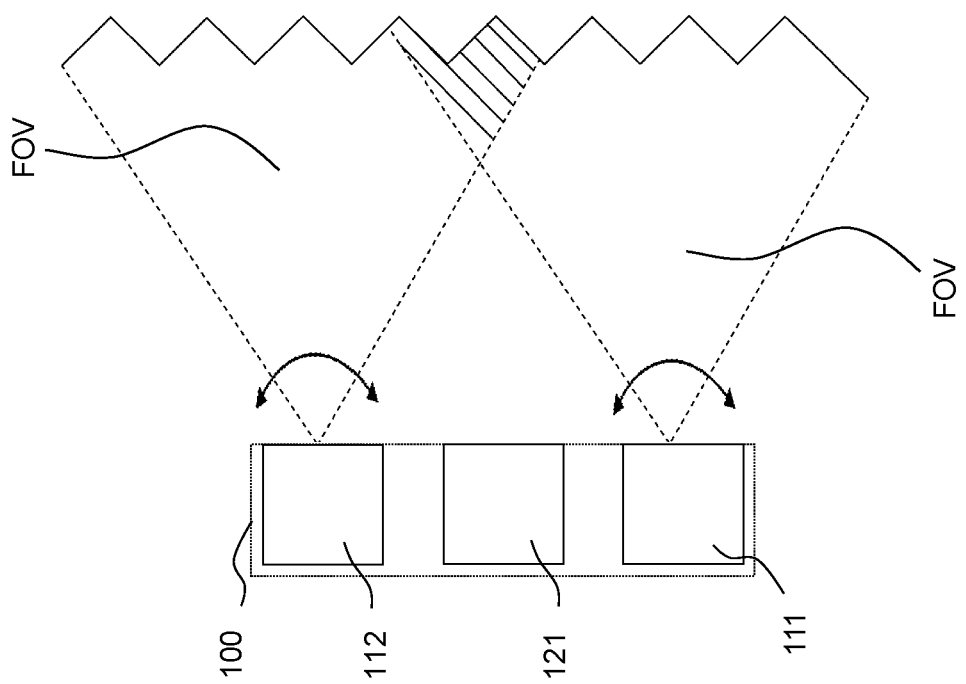

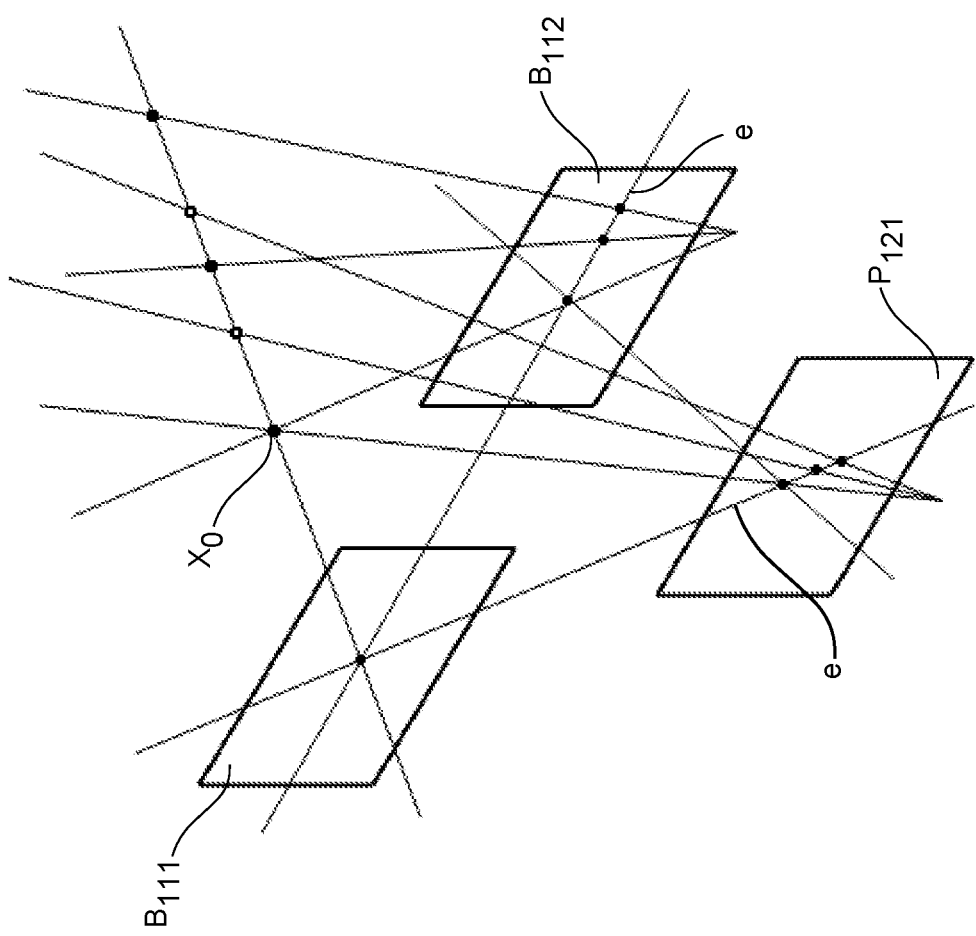

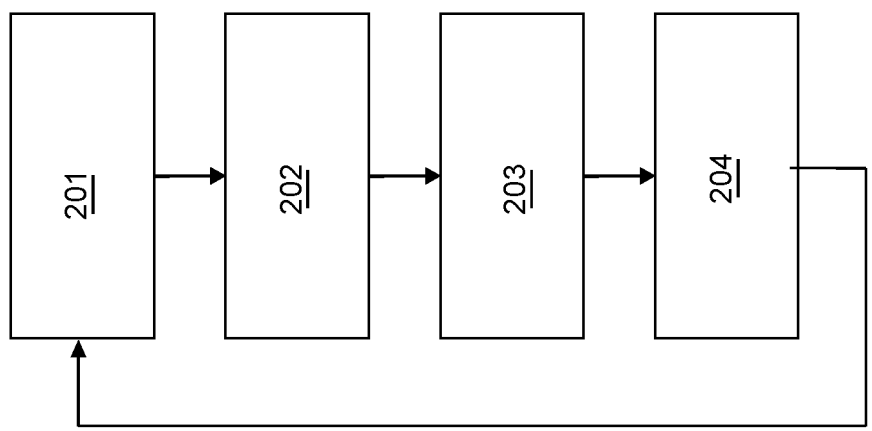

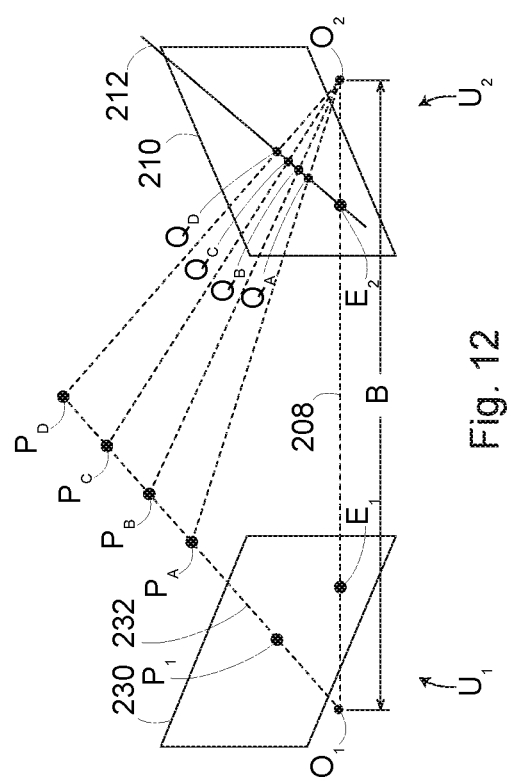

CALIBRATION PLATE AND METHOD FOR CALIBRATING A 3D MEASUREMENT DEVICE

CROSS REFERENCE TO RELATED APPLICATIONS

The present application claims priority to German Patent Application 10 2015 122 842.4 filed on Dec. 27, 2015, the contents of which are incorporated herein in their entirety.

BACKGROUND

A 3D measurement device is known from U.S. Pat. No. 6,826,299 B2. A projector projects light patterns onto the surface of an object to be scanned. The position of the projector is determined based on a projected encoded pattern. Two (or more) cameras, the relative positions and alignments of which are known or are determined, can record images of the surface with a further, uncoded pattern. Using mathematical methods which are known per se, such as epipolar geometry, the corresponding areas and points can be identified, allowing three-dimensional coordinates (points of the pattern) to be determined.

In gaming applications, scanners as tracking devices are known, in which a projector projects an encoded light pattern onto the target to be tracked, such as the user playing the game, in order to then record this encoded light pattern with a camera and determine the coordinates of the user. The data are represented on a suitable display.

U.S. Pat. No. 8,238,611 B2 discloses a system for scanning a scene including distance measurement. In its simplest form, the system consists of a camera unit with two cameras, optionally with filters, for stereoscopic registration of a target area, an illumination unit for generating a pattern in the target area, such as by means of a diffractive optical element, and a synchronizing unit, which synchronizes the illumination unit and camera unit with one another. Camera unit and illumination unit may be placed in selectable relative positions. Alternatively, two camera units or two illumination units may also be used.

All of these 3D measurement devices require calibration to provide accurate measurement data. Typically, however, the devices are calibrated initially at the factory, and then occasional checks are performed. A calibration plate may be used for this purpose. Calibration involves comparing measured data with reference data from the calibration plate and then adjusting the calibration parameters (compensation). By using known calibration plates show, for example, a regular array of uncoded or encoded point marks. The side of the calibration plate facing the 3D measurement device is antireflective to avoid reflecting light scattered from the environment.

BRIEF DESCRIPTION

According to one aspect of the disclosure a calibration plate for calibrating a 3D measurement device are provided. The calibration plate includes a planar body having a surface. A plurality of marks are arranged on the surface. The plurality of marks being configured to be recorded by the camera and can be identified in the resulting recorded images during operation of the 3D measurement device. A mirror is positioned on the surface that reflects incident beams from the 3D measurement device.

According to another aspect of the disclosure a method for calibrating a 3D measurement device using a calibration plate is provided. The method includes positioning the calibration plate in an environment of the 3D measurement device, the 3D measurement device having at least one camera and a projector. The calibration plate is recorded with the at least one camera. The position and alignment of the calibration plate is determined relative to the 3D measurement device using at least one of a plurality of marks formed on a surface of the calibration plate. The projector emits at least one beam of light onto a mirror positioned on the surface. The at least one beam of light is reflected with the mirror into the at least one camera. The at least one camera records at least one of a gray scale element or a color palette.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

Figure 1:
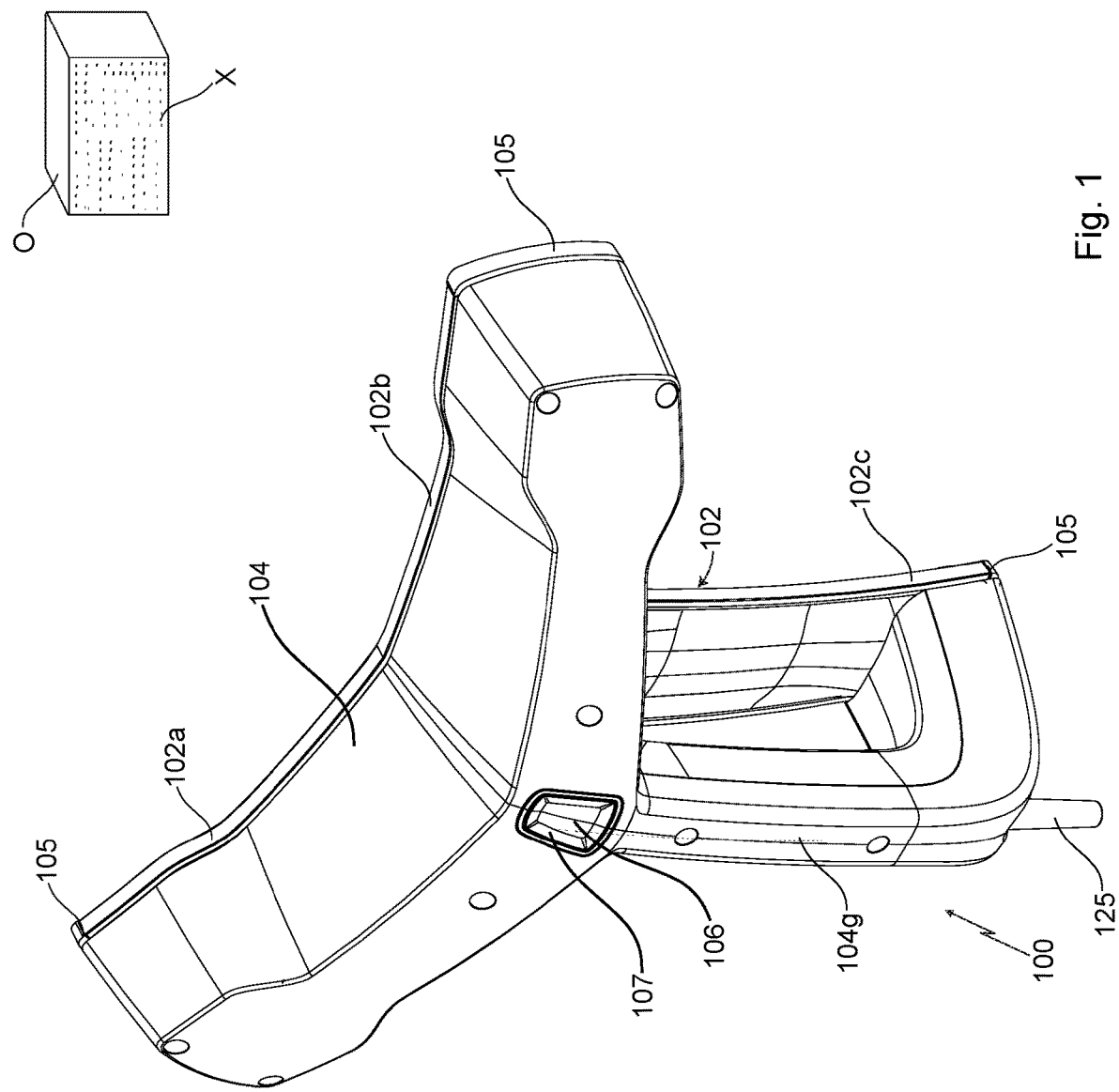
FIG. 1 a perspective view of a 3D measurement device and an object in the environment, FIG. 2 a view of the front side of the 3D measurement device, FIG. 3 a view of the back side of the 3D measurement device, FIG. 4 a plan view of the 3D measurement device from the top, FIG. 5 a right side view of the 3D measurement device, FIG. 6 a view corresponding to that of FIG. 1 without the housing, FIG. 7 a plan view of an example of a control and evaluation device with a display, FIG. 8 a side view of FIG. 7, FIG. 9 the fields of view of the cameras, with hash marks indicating the overlap area, FIG. 10 the geometric relationships among image planes, projector plane and epipolar lines, FIG. 11 an example of a method for optically scanning and measuring an environment, FIG. 12 an example with one epipolar line, FIG. 13 an example with two epipolar lines, FIG. 14 an example with inconsistencies, FIG. 15 a check of the relative geometry of the cameras, FIG. 16 a perspective view of a calibration plate, and FIG. 17 a calibration check using the calibration plate.
Figure 2:
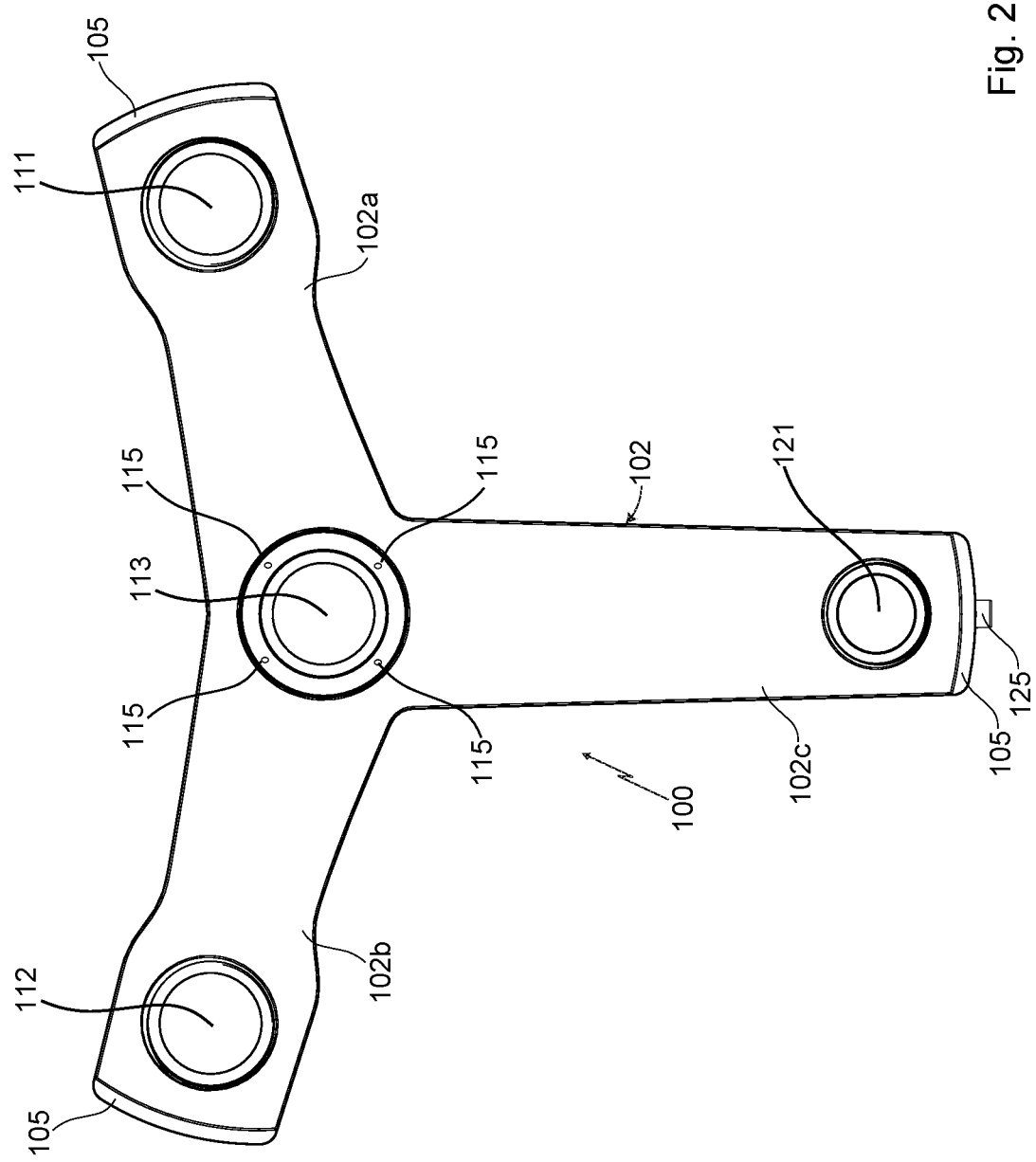
Figure 3:
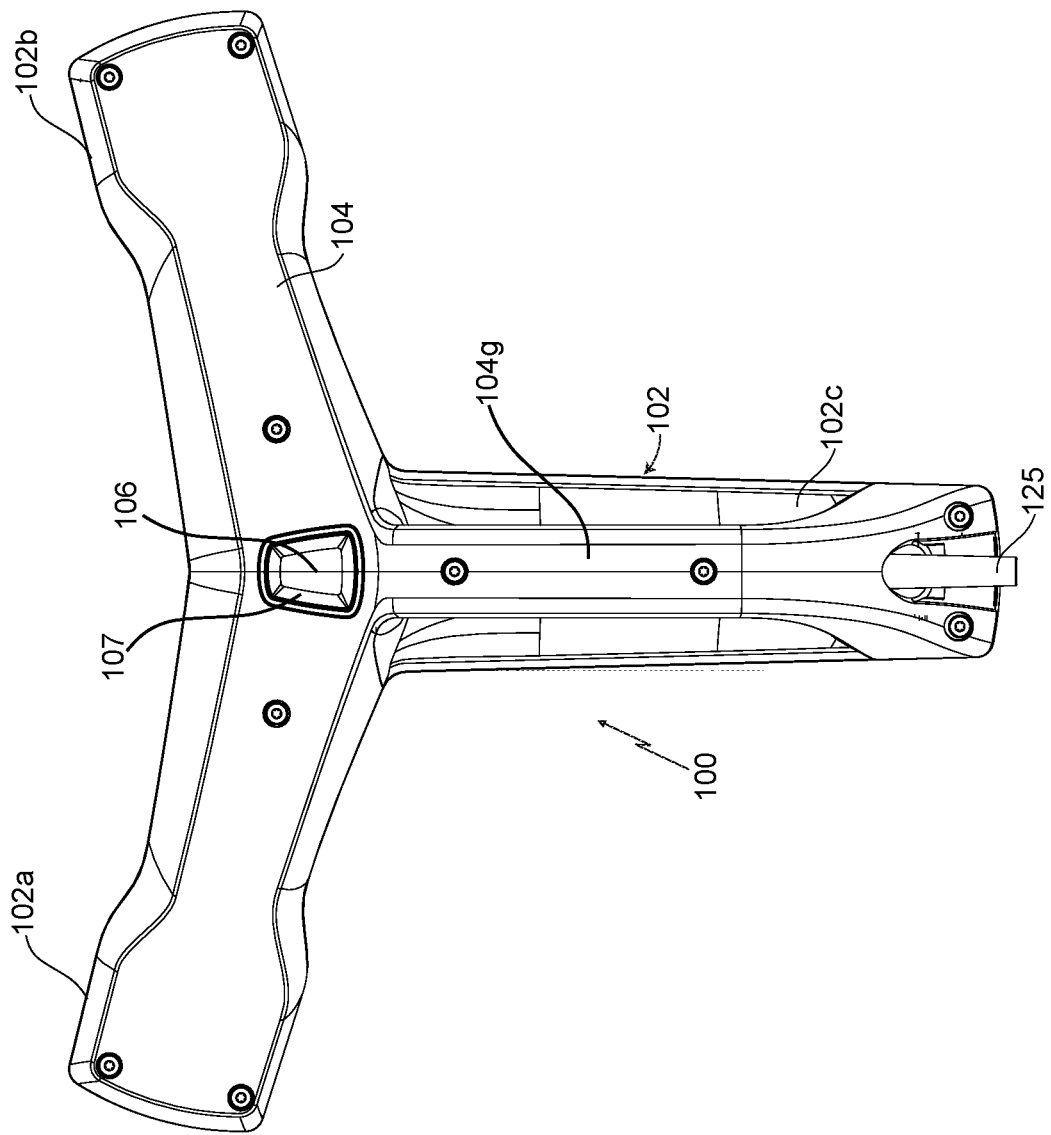
Figure 4:
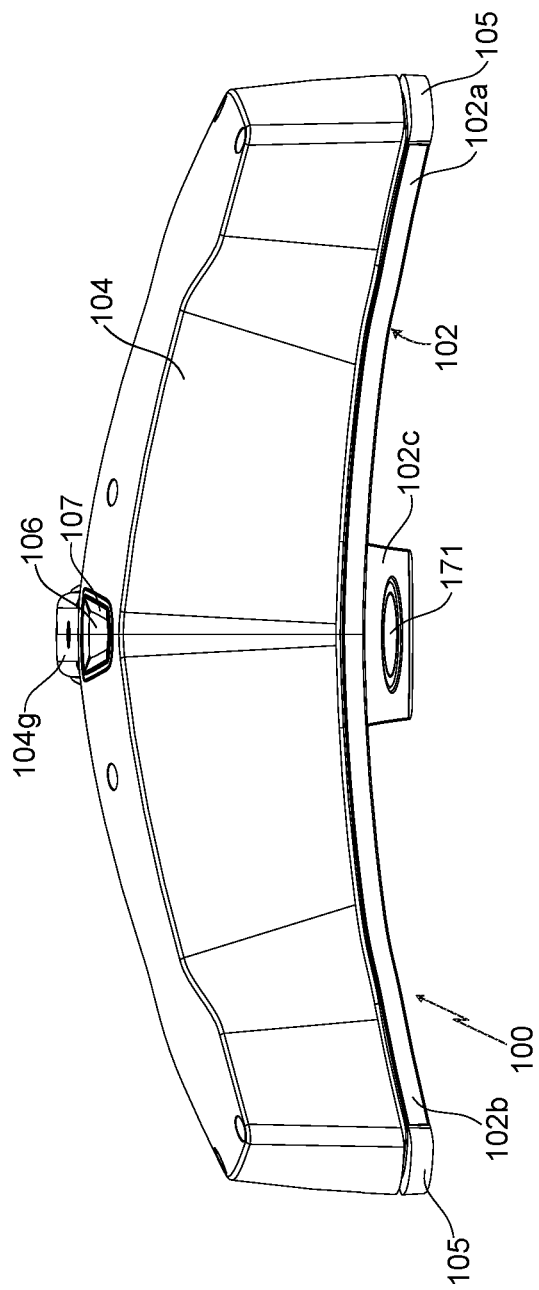
Figure 5:
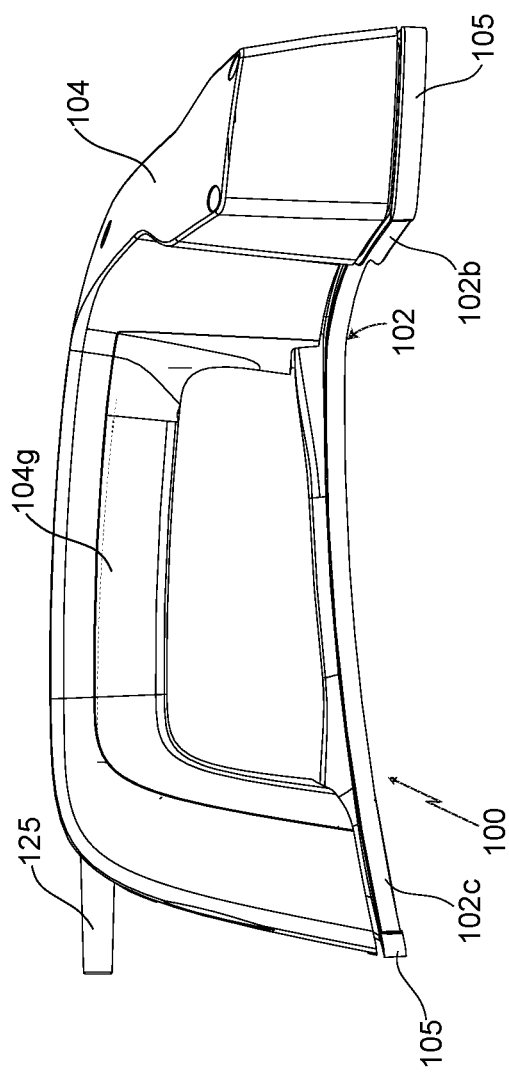
Figure 6:
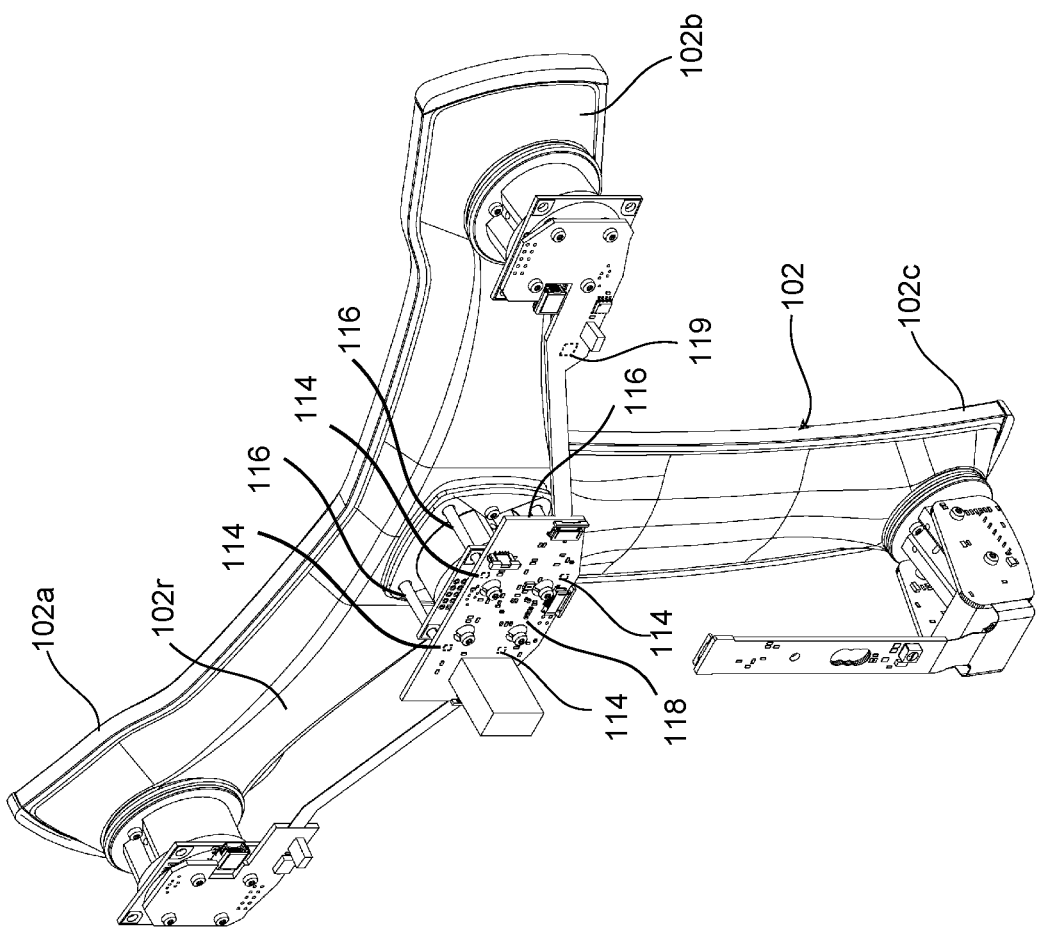

The detailed description explains embodiments of the disclosure, together with advantages and features, by way of example with reference to the drawings.

DETAILED DESCRIPTION

Embodiments of the present invention improve upon a calibration plate and a method for 3D measurement devices. These improvements are achieved according to embodiments of the invention with a calibration plate having the features of claim 1 and a method having the features of claim 11. Advantageous embodiments are the subject matter of the dependent claims.

The calibration plate is provided with various elements which can be recorded by the 3D measurement device. The calibration plate may be made of a mechanically and thermally (particularly) stable material, to ensure that the relative positions of the elements on the calibration plate remain constant. Information about these positions may be retrieved by means of an information code which can be applied to the calibration plate and can be recorded and interpreted by the 3D measurement device. A mirror allows a specific beam path to be generated.

Andrea Fasano et al., "Exploiting Mirrors for Laser Stripe 3D Scanning, 3D IM2003 (The 4th International Conference on 3D Imaging And Modeling, 6-10 Oct. 2003), the contents of which are incorporated by reference herein, proposes using a mirror when measuring an object by means of a 3D measurement device, to enable those areas that are not directly visible to the 3D measurement device to also be measured.

The 3D measurement device to be calibrated has a support structure, on which the projector for generating the beams and the cameras for recording images of the calibration plate are mounted.

The support structure, which may be mechanically and thermally stable, defines the relative distances between the cameras and the projector. It also roughly defines their relative alignments. Positioning the support structure on the front of the 3D measurement device, which faces the environment when the device is in normal use, has the advantage that these distances and alignments will not be impacted by deformations of the housing.

The term "projector" as used herein refers generally to a device for generating a pattern. The pattern may be generated by deflective methods, for example using diffractive optical elements or microlenses (or individual lasers), or by shading methods, for example using cover plates, transparencies (such as would be used in a transparency projector) and other masks. Deflective methods have the advantage that less light is wasted and therefore greater intensity is available. The projector may have a projection center which is the imaginary emission center for the beams of the projector, or the projector may emit parallel beams.

The components provided for distance measurement are not arranged colinearly. If one projector and two cameras are provided, these are arranged in a triangular configuration relative to one another.

The support structure may be provided with the same number of arms as the number of components that are provided for distance measurement, with these arms may be projecting outward from a common center. Said components may be provided at the ends of the arms to which they are assigned. Each of the components may be positioned on the back of the support structure. The optics of each component are aligned flush with a corresponding opening in the support structure, so as to be oriented and to protrude outward from the front side into the environment. A housing covers the back side and forms the handle.

The support structure may consist of a carbon- or glass fiber reinforced matrix composed of plastic or ceramic (or some other material). This material gives the device stability and makes it lightweight, and may also be formed with viewing areas. A concave (spherical) curvature on the front of the support structure not only offers design advantages, but also protects the optics of the components provided for distance measurement when the 3D measurement device is set down on its front side.

The projector generates the pattern, which may be in the infrared rather than the visible wavelength range. The two cameras are therefore sensitive in this wavelength range, whereas stray light and other interferences in the visible wavelength range can be filtered out. A 2D color camera, which likewise records images of the environment and the object, may be provided as a third camera for providing color information and object feature information. The color information thus obtained can then be used for coloring the 3D scan.

In some embodiments, the 3D measurement device generates multiple 3D scans of the same scene from different positions. The 3D scans are registered in a common system of coordinates. Recognizable structures may be advantageous in cases where two overlapping 3D scans will be joined. Such recognizable structures may be continuously searched and displayed, or in other embodiments are displayed after the recording process. If the density does not appear to be sufficient in a particular area, additional 3D scans of that area may be generated. Subdividing the display that is used for displaying a video image and the (adjoining portions of the) three-dimensional point cloud helps to identify areas in which additional scans should be generated.

In some embodiments, the 3D measurement device is a portable device, thus it operates at high speed and is lightweight. In other words, it has a size and weight suitable to be carried and operated by a single user. In other embodiments, the 3D measurement device may be mounted on a tripod (or some other stand), on a manually movable trolley (or some other conveyance), or on a self-navigating robot, in which case it is no longer carried by the user, and a different housing may be used, for example one without a handle. The term "3D measurement device" is therefore to be interpreted broadly to include scanners that are generally designed as compact units, which are stationary or mobile and may be fitted with other devices.

Referring now to the FIGS., a 3D measurement device 100 is provided for optically scanning and measuring objects O in an environment. The 3D measurement device 100 may be a portable device (FIGS. 1 to 6). The side of 3D measurement device 100 that faces the user—when used properly—is referred to as the back side, and the side that faces the environment is referred to as the front side. This definition also extends to the components of the 3D measurement device 100.

The 3D measurement device 100 has (on its front side) a support structure 102 with three arms 102a, 102b, 102c, which give the support structure 102 a T-shape or a Y-shape, in other words a triangular configuration. The area where the three arms 102a, 102b, 102c are interconnected and from which the three arms 102a, 102b, 102c protrude defines the center of 3D measurement device 100. From the point of view of the user, when used properly, support structure 102 has a left arm 102a, a right arm 102b and a lower arm 102c. In this case, the angle between left arm 102a and right arm 102b is about 150°±20°, and the angle between left arm 102a and lower arm 102c is about 105°±10°. Lower arm 102c is typically somewhat longer than the other two arms 102a, 102b.

Support structure 102 may be formed from a carbon fiber reinforced plastic (CFRP), or, for example, from a carbon fiber reinforced ceramic or a glass fiber reinforced plastic. This material makes support structure 102 mechanically and thermally stable but also lightweight. Perpendicular to arms 102a, 102b, 102c, the dimensions of support structure 102 are significantly shorter (for example 5 to 15 mm) than the length of arms 102a, 102b, 102c (for example, 15 to 25 cm). Support structure 102 thus has a flat basic form, in this case with the center of some sections of arms 102a, 102b, 102c being reinforced on the back side. However, the support structure may be configured as curved. This curvature of support structure 102 conforms to the curvature of a sphere having a radius of about 1 to 3 m. The front side (facing object O) of support structure 102 is thus concave and the back side is convex. The curved shape of support structure 102 is beneficial in terms of stability. The front side of support structure 102 (and in this case, the visible areas of the back side) is designed as a viewing area, i.e. without face plates, cover panels, facings or other coverings. The exemplary embodiment made of fiber reinforced plastics or ceramics is particularly suitable for this.

On the back side of support structure 102, a housing 104 is arranged, which is floatingly connected with a certain amount of clearance to support structure 102 by suitable connecting means, such as rubber gaskets and screws, at the ends of the three arms 102a, 102b, 102c. The edge of housing 104 in the area of left arm 102a and right arm 102b extends up close to support structure 102, whereas in the area of lower arm 102c, housing 104 extends outward from the center of 3D measurement device 100, spaced from support structure 102, forming a handle 104g, and then turns at the end of handle 104g and extends back to the end of lower arm 102c, to which it is floatingly connected, with its edge extending up close to support structure 102. If a reinforced back 102r is provided on some sections of support structure 102, this back 102r projects into the interior of housing 104. Housing 104 acts as a cover.

Protective elements 105 may be attached to housing 104 or to support structure 102, particularly at the ends of arms 102a, 102b, 102c, to protect against shocks and consequent damage. When not in use, 3D measurement device 100 may be placed face down. Due to the concave curvature of the front side, it will then rest on the ends of arms 102a, 102b, 102c. Protective elements 105 at the ends of arms 102a, 102b, 102c are beneficial in this case as well, since 3D measurement device 100 can rest on them. In addition, nubs made of a soft material, for example rubber, may optionally be applied to housing 104, particularly to handle 104g, to ensure secure contact with the hand of the user.

On the back side of housing 104, at the center of 3D measurement device 100, a control element 106 is provided, with which at least the optical scanning and measuring, that is to say the measuring process (and particularly the projection and recording process), can be started and stopped. Control element 106, may be embodied as a control knob, and may be multifunctional by means of time-structured sequences and/or spatially distinguishable operating directions, for example, i.e. rather than being actuable in a single direction, control element 106 may be tilted distinguishably in multiple directions. One or more status lights 107 may be arranged around operating element 106, which indicate the current status of 3D measurement device 100 thereby facilitating its operation. Status lights 107 may display different colors (green, red . . . ) indicating the status of the instrument. In an embodiment, status lights 107 are light emitting diodes (LEDs).

On support structure 102—spaced a defined distance from one another—a first camera 111 is provided on left arm 102a (at its end) and a second camera 112 is provided on right arm 102b (at its end). More precisely, the two cameras 111 and 112 are disposed on the back side of support structure 102 and secured thereto, with support structure 102 having openings for each camera, through which the respective camera 111, 112 can see outward toward the front side of support structure 102. The two cameras 111, 112 may be surrounded by the connecting means for floatingly connecting housing 104 to support structure 102.

First camera 111 and second camera 112 are adjusted relative to one another such that their fields of view FOV overlap, producing stereoscopic images of objects O. In an embodiment in which the alignments are fixed, an optimal overlap area which is dependent upon the specific use is produced. The fixed alignments may at first be discretionary (and unknown), and then later provided to the 3D measurement device 100, for example during factory calibration. In terms of accuracy, an overlap area similar to the dimensions of 3D measurement device 100 would be advantageous. In another embodiment, the alignments may be adjusted to enable the overlap of the fields of view FOV to be optimized based on the distance from the 3D measurement device 100 to the objects to be measured O. By tracking the adjustments made by the user to the alignments, for example pivoting cameras 111 and 112 in opposite directions, the 3D measurement device 100 determines the alignment. If the first and second cameras 111, 112 are adjusted, a calibration is performed in the field to determine the angles and positions of the cameras in 3D measurement device 100. The types of calibration will be described further below.

First camera 111 and second camera 112 may be monochromatic, i.e. sensitive to light in a narrow wavelength range, for example they have appropriate filters for filtering out other wavelength ranges including those of stray light. This narrow wavelength range may be in the infrared range. To obtain color information about the objects O, 3D measurement device 100 may also have a 2D camera 113, such as a color camera. The 2D camera 113 may be aligned symmetrically to first camera 111 and second camera 112, and may be positioned between the two cameras, at the center of 3D measuring device 100. The 2D camera 113 is sensitive to light in the visible wavelength range. The 2D camera 113 records 2D images of the scene, that is to say, the environment of 3D measurement device 100 including the objects O contained therein.

To illuminate the scene for 2D camera 113 under unfavorable lighting conditions, at least one, and in this case four (powerful) light-emitting diodes (LED) 114 are provided. Each light-emitting diode 114 is assigned a radiating element 115, which radiates the light from the light-emitting diode 114 based on the alignment of 3D measurement device 100. Such a radiating element 115 may be a lens, for example, or a suitably configured end of a light guide. The (in this case, four) radiating elements 115 are arranged evenly spaced around 2D camera 113. Each light-emitting diode 114 is connected by means of a light guide 116 to its assigned radiating element 115. Light-emitting diodes 114 can therefore be arranged structurally on a control unit 118 of 3D measurement device 100, particularly attached to a circuit board thereof.

As a later reference for the images recorded by cameras 111, 112, 113, an inclinometer 119 may be provided. Inclinometer 119 may be an acceleration sensor (having one or more sensitive axes), which is produced in a known manner as an MEMS (microelectromechanical system). Other embodiments and combinations are also possible for inclinometer 119. All of the data from the 3D measurement device 100 have a gravitational direction (as one component), which is supplied by the inclinometer 119.

In principle, three-dimensional data could be determined simply from the images recorded by first camera 111 and second camera 112, in other words, 3D scans of objects O could be produced, for example, by means of photogrammetry. However, the objects O often have few structures and many smooth surfaces, making it difficult to produce 3D scans from the scattered light from the objects O.

A projector 121 is therefore provided, which is arranged on and attached to lower arm 102c (at its end) on the back side of support structure 102 in a manner similar to cameras 111, 112, 113, i.e. support structure 102 has an opening through which projector 121 can protrude toward the front side of support structure 102. Projector 121 may be surrounded by the connecting means for the floating connection of housing 104 to support structure 102. Projector 121, first camera 111 and second camera 112 are arranged in a triangular configuration relative to one another and are oriented toward the environment of 3D measurement device 100. The relative angles of first camera 111, second camera 112 and projector 121 are adjusted according to the measurement distance between 3D measurement device 100 and object O. As described above, the relative alignment may be preset or may be adjusted by the user.

If 3D measurement device 100 is placed on its front side, that is to say with its front side facing downward on a surface, when not in use, the concave curvature of the front side will keep cameras 111, 112, 113 and projector 121 spaced from the surface, thereby protecting the lenses of these components from damage.

Cameras 111, 112, 113, projector 121, control element 106, status lights 107, light-emitting diodes 114 and inclinometer 119 are connected to common control unit 118, which is located inside housing 104. This control unit 118 may be part of a control and evaluation device integrated into the housing. In some embodiments, however, said control unit 118 is connected to a standardized communications interface on housing 104, which is designed as a transmitting and receiving unit for a wireless connection (e.g. Bluetooth, WLAN, DECT) or for a wired connection (e.g., USB, LAN), and optionally as a special interface, as described in DE 10 2009 010 465 B3. The communications interface is connected by means of said wireless or wired connection to an external control and evaluation device 122. Control and evaluation device 122 is assigned to 3D measurement device 100. In this case, the communications interface is designed for a wired connection, with a cable 125 being plugged into housing 104, for example at the lower end of handle 104g, so that cable 125 leads into an extension of handle 104g.

Control and evaluation device 122 comprises one or more processors 122a for implementing the method for operating and controlling 3D measurement device 100 and for evaluating the measurement data. The control and evaluation device 122 may be a portable computer (notebook) or a tablet (or smartphone) (for example, FIGS. 7 and 8), or an external computer (for example, via the Internet) on which software designed specifically for controlling 3D measurement device 100 and for evaluating the measurement data is run, and which is connected to the portable part of 3D measurement device 100. However, control and evaluation device 122 may also be a specific hardware component, or may be integrated into the portable part of 3D measurement device 100. Control and evaluation device 122 may also be a system of dispersed components, with at least one component integrated into the portable part of 3D measurement device 100 and at least one external component. The processor or processors 122a may then be embedded into 3D measurement device 100 or into an external computer.

Projector 121 projects a pattern X onto the objects O to be scanned, which it generates, for example, using a diffractive optical element. Pattern X need not be encoded (i.e., having a unique pattern), and may instead be uncoded, e.g. by projecting periodically spaced pattern elements (for example, light spots or light lines). The correspondence between the pattern elements projected by projector 121 and the pattern elements in the images on the photo sensors of cameras 111, 112 is determined by epipolar conditions to be fulfilled at the same time, and using calibration parameters, as detailed below. The ambiguity is resolved by the use of two cameras 111 and 112 in combination with precise knowledge regarding the shape and direction of the pattern, with this combined knowledge stemming from the calibration of 3D measurement device 100.

In the following, the term "pattern element" is meant to emphasize the form of an element of the pattern X, whereas the term "point" is used to describe the position (of a pattern element or of something else) in 3D coordinates.

The uncoded pattern X (FIG. 1) may be a point pattern, comprising a regular array of spots in a grid. In the present example, about one hundred times one hundred points (10,000 points in total) are projected over a field of view FOV (FIG. 9) of about 50° at a distance of approximately 0.5 m to 5 m. The pattern X may also be a line pattern or a combined pattern of points and lines, each of which is formed by tightly arranged points of light. First camera 111 has a first image plane B111, and second camera 112 has a second image plane B112. The two cameras 111 and 112 receive at least a portion of the pattern X in their respective image planes B111 and B112, in which the photo sensor (for example CMOS or CCD) is arranged to record a portion of the pattern X reflected from the object O.

A relationship exists between the point density of pattern X over the field of view FOV angle, the distance between projector 121 and object O, and the resolution that can be achieved with the generated pattern X on the object O. For individual paired images from cameras 111, 112, a higher point density of pattern X leads to a greater ability to resolve relatively fine structures of object O than with lower point densities of the pattern X on the object O. It therefore seems useful to be able to generate, in addition to first pattern X, at least one additional pattern which has a different density of the projected spots. Depending on the generation of the patterns, a dynamic transition between the patterns and/or a spatial intermingling is possible, in order to adjust the point density to the structures of the object O. Projector 121 may generate the two patterns offset from one another in terms of time and/or in a different wavelength range and/or with different intensity.

In an embodiment, the monochromatic pattern X may be generated by means of a diffractive optical element 124 in projector 121. Diffractive optical element 124 converts a single beam from a light source 121a in FIG. 18 into a collection of smaller beams, each of which goes in a different direction to produce a spot when it strikes the object O. Light source 121a may be a laser, a superluminescent diode or an LED, for example. In one embodiment, the wavelength of light source 121a is in the infrared range. In that case, lateral resolution is limited only by the size and spacing of the spots in the projected pattern X. If the pattern X is the infrared range, the images recorded by 2D camera 113 can be generated without interference with the pattern X. The pattern X could alternatively be generated in the ultraviolet range for the same purpose.

For reasons of energy efficiency and eye safety, the two cameras 111, 112 and the projector 121 are synchronized to record the pattern X as soon as it is projected by projector 121, and the pattern X may be a pulsed pattern. Each projection and recording process begins with projector 121 generating the pattern X, similarly to a flash in photography, and cameras 111 and 112 (and optionally 113) each following with an image recording process in which they each record at least one image for each projection of the pattern X. The term "recording" is meant to encompass the two images that are recorded simultaneously by the two cameras 111 and 112. The projection and recording process may comprise a single recording of an image (shot), or a sequence of recordings (video). Such a shot or such a video is triggered by means of control element 106. Once the data have been processed, each recording provides 3D scan data, in other words a point cloud in the three-dimensional (3D) space, the point cloud being indicated as relative coordinates of the 3D measurement device 100.

Rather than being arranged colinearly to the two cameras 111 and 112, projector 121 is arranged so as to form a triangle relative to the cameras 111, 112. This triangular configuration enables the use of epipolar geometry based on mathematical optics methods. The conditions of epipolar geometry state that a point in the projector plane P121 of projector 121 will fall on a first epipolar line in the first image plane B111 and on a second epipolar line in the second image plane B112, the epipolar lines for each of the image planes B111 and B112 being determined by the relative geometry of projector 121 and of the two cameras 111 and 112. In addition, a point in the first image plane B111 will fall on an epipolar line in projector plane P121 and on an epipolar line in the second image plane B112, the epipolar lines for the projector plane P121 and the second image plane B112 being determined by the relative geometry of projector 121 and of cameras 111 and 112. Furthermore, a point in the second image plane B112 will fall on an epipolar line in projector plane P121 and on an epipolar line in the first image plane B111, the epipolar lines for projector plane P121 and the first image plane B111 being determined by the relative geometry of projector 121 and of cameras 111 and 112. It has been found that the use of at least two cameras and one projector generates adequate epipolar conditions to enable a correspondence between the points of the pattern X to be determined with the points in image planes B111 and B112 and in projector plane P121, even if the projected pattern elements have no distinguishable features, for example they are identical.

In the present case, (at least) three devices (projector 121 and the two cameras 111 and 112) are involved, i.e. proceeding from each device, two stereo geometries (each having an abundance of epipolar lines e) with the other two devices can be defined in each case. Thus with the present arrangement, unique three-part relationships of points and epipolar lines e are produced, from which the correspondence of the images of the pattern X in the two image planes B-111, B112 can be determined. Due to the additional stereo geometry (as opposed to a pair of cameras), significantly more of the otherwise indistinguishable pattern points on an epipolar line e can then be identified. This enables the density of features to be kept high while at the same time keeping the feature size very low. With alternative methods involving encoded patterns (with features that consist of multiple points, for example), the feature size has a lower limit that limits lateral resolution. As soon as said correspondence between the points of the pattern X of projector 121 and the two cameras 111, 112 has been determined, the three-dimensional coordinates of the points on the surface of the object O are determined for the 3D scan data by triangulation.

Triangulation calculations can be performed between the two cameras 111, 112 based on the baseline distance between the two cameras 111, 112 and the relative tilt angles of the two cameras 111, 112. Triangulation calculations may be performed between projector 121 and the first camera 111 and between projector 121 and the second camera 112. To perform these triangulation calculations, a baseline distance between projector 121 and the first camera 111 and another baseline distance between projector 121 and the second camera 112 is required. The relative tilt angles between projector/first camera and projector/second camera are also required.

In principle, one of the triangulation calculations is sufficient to determine the three-dimensional coordinates of the points of the pattern X on the object, and therefore the two extra triangulation calculations supply redundant information (redundancies), which is expediently used for a self-verification of the measurement results and for a self-calibration function, as described below. The term "redundancy" is meant to refer to multiple options for determining the 3D coordinates.

Additional three-dimensional data may be obtained by means of photogrammetry from multiple recorded images from different camera positions, for example, from 2D camera 113 or from a portion of the signals from cameras 111 and 112. So that the objects may be seen by cameras 111, 112 and 113 in order to perform photogrammetric calculations, it is important for the objects to be adequately illuminated. Such illumination may involve backlighting, for example, with sunlight or artificial light, or may be provided by the 3D measurement device 100 or by some other external light source. In one embodiment, the object is illuminated with light from LEDs 114, which are components of 3D measurement device 1000. If photogrammetry will be used, the object must be illuminated to a certain degree. Illumination enables the two-dimensional cameras 111, 112, 113 to perceive characteristics of the object such as color, contrast and shadow, which helps to identify the object features.

The measuring process also has a temporal aspect. Whereas with stationary devices, a whole sequence of patterns may be projected and images recorded to establish a single 3D scan, in the present case a 3D scan is generated with each shot of 3D measurement device 100. In another embodiment (not shown), for special measurements a second projector in addition to the present projector 121, or an additional diffractive optical element in addition to the present element, or at least one additional pattern in addition to the pattern X is provided. It is then possible, through appropriate switch-over steps, to record images of different patterns on a continuous basis in a single shot, giving the 3D scan higher resolution by combining the evaluation results with respect to the different patterns.

To capture the entire scene, the 3D scans generated with the shot must be registered, i.e. the three-dimensional point clouds of each recording must be inserted into a common system of coordinates. Registration may be accomplished, for example, using videogrammetry, for instance "structure from motion" (SFM) or "simultaneous localization and mapping" (SLAM). For common points of reference, the natural texture of the objects O may be used, or a stationary pattern Y may be generated.

In control and evaluation device 122, the data supplied by 3D measurement device 100 are processed, i.e. the 3D scans are produced from the images. The 3D scans are in turn joined, i.e. registered in a common system of coordinates. For registration, the known methods may be used, i.e. natural or artificial targets (i.e. recognizable structures) may be localized and identified for example in the overlapping areas of two 3D scans, in order to determine the assignment of the two 3D scans based on correspondence pairs. An entire scene is thereby gradually captured by the 3D measurement device 100. Control and evaluation device 122 has a display 130 (display device), which is integrated or connected externally.

The method steps in the measurement process (i.e. the scanning process) described thus far, in other words the method for optically scanning and measuring the environment of 3D measurement device 100, may be combined into four process blocks, as illustrated schematically in FIG. 8. In a first process block 201, the projection and image recording process (shot) for an image is carried out, i.e. measured values are recorded. In a second process block 202, the evaluation (of the measured values) and compilation of 3D scan data from the recorded image are carried out. In a third process block 203, multiple 3D scans are registered (in the common system of coordinates) and the evaluations are represented (on display 130), and the 3D scan data may be saved. In an optional fourth process block 204, the calibration is checked; this fourth process block 204 may also be an integral component of the second process block 202, or may immediately follow said block. If additional recorded images are required, for example by continuously pressing control element 106, the method will return to the first process block 201.

In the second process block 202, images of specific points in one recording are selected automatically to find the correspondence. These selected images of points in the recording correspond to points on the object O, in particular pattern elements (e.g. spots) of the pattern X. For each such image of a point in the first image plane B111, the epipolar lines e in the second image plane B112 and in the projector plane P121 are localized in sequence. This process is repeated for images of points in the second image plane B112 and in the projector plane P121, by localizing the epipolar lines e in the other two planes as described above. These multiple epipolar conditions allow the one-to-one correspondence to be determined in each of the three planes between the projected and the recorded pattern elements (for example, identical spots). As shown in FIG. 10, the point X0 (from the pattern X on the object O) is visible in all three planes B111, B112, P121 (depicted), and images of said point lies on two epipolar lines e in each case. The point X0 is the point of intersection of three straight lines, a light beam from the projector 121 and a light of sight from each of the two cameras 111 and 112. The point X0 is uniquely identifiable if the density of the points of the pattern X is sufficiently low.

To determine the 3D coordinates of the measured points, i.e. to evaluate the measured values and compile the 3D scan data from the recorded images, calibration parameters originating from the last calibration are taken into consideration. The calibration parameters must be corrected if spatial inconsistencies (inconsistencies in geometry) and temporal inconsistencies (parameters changing over time) are detected in the recorded images during evaluation of the measured values. These inconsistencies may be the result of thermal conditions, for example, due to an increase in the operating temperature, or may have a mechanical cause, for example a mechanical shock, such as might occur if the 3D measurement device 100 were to be dropped on the ground. The inconsistencies are manifested as deviations in the measured positions, angles, and other geometric features, for example, of the points on the object O or in the planes B111, B112, P121.

The calibration parameters that may require correction may be extrinsic parameters, intrinsic parameters and operating parameters. Extrinsic parameters for each unit (cameras 111, 112, 113 and projector 121) are generally the six degrees of freedom of a rigid body, i.e. three spatial coordinates and three angles. Particularly relevant is the relative geometry of the units i.e. the relative distances and the relative angles of their alignments. Intrinsic parameters refer to camera and projector device characteristics, such as focal length, position of the primary point, distortion parameters, centering of the photo sensor array or the MEMS projector array, the dimensions of these arrays in each dimension, the rotation of these arrays relative to the local system of coordinates of the 3D measurement device 100, and the aberration correction coefficients for the camera lens or projector lens systems. Operating parameters include the wavelength of the light source 121a, the temperature and the humidity.

With respect to FIG. 10, an inconsistency may be a deviation in the actual position of the point X0 from its expected position in one of the three planes.

As described above, the epipolar conditions are solved simultaneously to determine the correspondence of projected and recorded pattern elements (i.e., from the images thereof) in the two cameras 111, 112 and the one projector 121. Some redundant information (redundancies) from these equations to be fulfilled simultaneously are available for identifying inconsistencies in the correspondences.

In addition, as described above, three separate triangulation calculations may be performed in order to obtain three sets of 3D coordinates. These three triangulation calculations are performed for the first and second cameras 111, 112 (stereo cameras), for the projector 121 and the first camera 111, and for the projector 121 and the second camera 112. The 3D coordinates obtained from the three different triangulation calculations can be compared, and if inconsistencies are detected, adjustments may be made to the calibration parameters.

Figure 13:
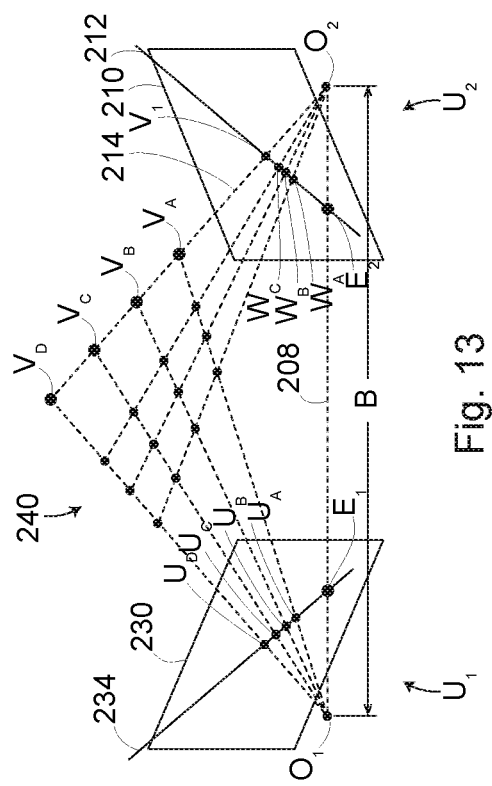

FIG. 12 shows a simplified situation involving an inconsistency with two units U1, U2, either two cameras 111, 112 or one projector 121 and one camera 111, 112. Each unit U1, U2 comprises a plane in which points may be selected. The two epipolar lines e are common to both planes. A selected point 236 in the plane of unit U1 corresponds to a point 216 in the plane of unit U2. The two points are images of an actual point on the object O. The correspondence may be found, for example, in that point 216, 236 may be the image of a spot from the pattern X on the object O, i.e. point 216, 236 is illuminated and the area around it is dark. However, the distance of point 216 perpendicular to the epipolar lines e is not the same in both planes, and instead there is a deviation Δ, i.e. a deviation Δ between the actual position of point 216 and the expected position 218. In general, the deviation Δ is a vector. With two units, in particular, a projector 121 and a camera 111, only the component of the deviation Δ perpendicular to the epipolar lines e is known. The component parallel to the epipolar lines e disappears when the 3D coordinates are determined. With more than two units, particularly with one projector 121 and two cameras 111, 112, the components of the deviation Δ can be determined in both dimensions of the planes based on the aforementioned redundancies (when finding the deviations and when determining the 3D coordinates). When deviations Δ exist for multiple selected points, all deviations Δ can be plotted on a map, the error field, which is illustrated in FIG. 13. If only two units are involved, only one component of each deviation Δ may be plotted in the error field. If there is only one basis for the inconsistency, the error field is typical of a certain type of inconsistency. FIG. 13 shows the error field for a rotation of the first camera 111 about the viewing angle, i.e. the calibration parameter for the roll angle of the first camera 111 must be corrected.

Figure 14:
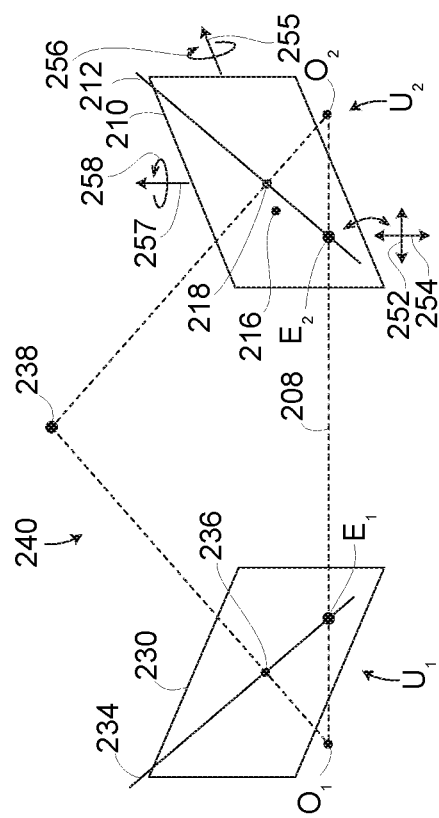

The deviations will now be specified in greater detail with respect to the epipolar conditions, in reference to FIGS. 12 to 14. There are two options for the units involved. One option is for one of units U1, U2 to be a camera and the other a projector. The other option is for both units U1, U2 to be cameras. Of course, additional projectors or cameras may be provided. With three or more units (for example with two cameras and one projector), additional options for automatically determining the calibration parameters exist, as will be discussed further below.

Each of units U1, U2 has a point of origin, also known as the projection center O1, O2. This point represents a point through which all beams pass out of the unit (in the case of a projector) or into the unit (in the case of a camera). In an actual unit, not all beams pass through the projection center, and instead, corrections to the calibration parameters of the camera system may be made using software, to bring the corrected beams through these points. The two projection centers O1, O2 define the baseline 208.

Each unit U1, U2 also has a plane 210, 230 in which images are produced. In a projector, this plane is known as projector plane P121, and in a camera, it is known as image plane B111, B112. In an actual projector or an actual camera, projector plane P121 and image plane B111, B112 are located behind projection centers O1, O2 rather than in front of them, as shown in FIG. 12. In most cases, a component such as an image sensor (in a camera) or a pattern generator (in a projector) is arranged at the position of the plane behind the projection center O1, O2. However, the positioning of the planes in front of the projection centers O1, O2, as shown in FIG. 12, is mathematically equivalent to the planes being arranged on the other side of the projection centers O1, O2.

The projection centers O1, O2 are spaced from one another by a baseline distance B. The baseline 208 that connects the projection centers O1, O2 intersects the planes 230, 210 at points E1, E2. The points of intersection are referred to as epipolar points or epipoles E1, E2. A line drawn through one of epipoles E1, E2 on a corresponding plane is referred to as an epipolar line. For plane 210 and the corresponding epipole E2, line 212 is the epipolar line. A point P1 on plane 230 lies on epipolar line 212.

As described above, each beam, for example beam 232, passes through a projection center O1, O2 to reach a plane 230, 210 in which images are produced. If plane 230 is a projector plane, point P1 will be projected onto an object at a point such as PA, PB, PC, or PD, depending on the distance from the object. In unit U2, which in this case is a camera, these points PA, PB, PC, PD, which share the common beam 232, fall on corresponding points QA, QB, QC, and QD on epipolar line 212. Beam 232 and epipolar line 212 both lie in the plane that contains the points O1, O2 and PD. If plane 230 is an image plane rather than a projector plane, the point P1 received in the image plane may originate from any point on epipolar line 212, for example from one of points QA, QB, QC, or QD.

FIG. 13 shows an epipolar line 234 in plane 230 of unit U1 in addition to epipolar line 212 in plane 210 of unit U2. Each point V1 (and WA, WB, WC) on epipolar line 212 has a corresponding point (image or projection point) UA, UB, UC, UD on epipolar line 234. At the same time, each point UA, UB, UC, UD on epipolar line 234 has a corresponding point WA, WB, WC, V1 on epipolar line 212. The set of points 240 represents points, for example, VA, VB, VC, VD in space which may intersect with object O.

In one embodiment of the present invention, the first step in checking the calibration parameters involves identifying inconsistencies in the positions of images of selected points in the projector and image planes relative to the positions that would be expected based on the epipolar conditions.

One example of such an inconsistency in illustrated in FIG. 14. A point 236 on plane 230 intersects an object at point 238. Based on the epipolar conditions, point 238 should appear on epipolar line 212, specifically at point 218. In this case, the actual point is observed at position 216. In general, with only two planes 210, 230 it is known only that for a point 236 which lies on epipolar line 234, a corresponding point should lie on epipolar line 212. The fact that point 216 does not fall on epipolar line 212 indicates that there is a problem with the calibration parameters. But whether the defective calibration parameter(s) is/are an extrinsic parameter, an intrinsic parameter or an operating parameter may be concluded based on the observation of a single point 216.

FIG. 14 illustrates a number of errors that can be identified in extrinsic calibration parameters. One identifiable error type is found in baseline 208, and not merely in baseline distance 208, but also in the specific position of the projection centers O1, O2, in other words, in the coordinates of the projection centers along nominal baseline 208 (error 252) and in a direction perpendicular to the direction of nominal baseline 208 (error 254). Another possible error is found in the angular orientation of unit U1 or unit U2. One option for describing orientation is based on a pitch angle 256 about an axis 255 and a yaw angle 258 about an axis 257. If the calibration parameters for the pitch angle and the yaw angle of planes 230 and 210 are incorrect, points in the planes will not match the positions that are expected based on the epipolar conditions. Unit U1, U2 may also have an incorrect calibration parameter of the roll angle of the camera or the projector. The calibration parameter of the roll angle is sometimes regarded as an intrinsic calibration parameter rather than an extrinsic parameter.

If the deviations and inconsistencies resulting from an inaccurate calibration that requires correction are too great, difficulties may arise in determining the correspondences for point X0 while simultaneously fulfilling the epipolar conditions. In one embodiment, pattern X consists of a large number of low-intensity points (e.g. 10,000) and a smaller number of high-intensity points (e.g. 1,000). This variation in intensities allows 3D measurement device 100 to detect objects with high reflectivity and objects with low reflectivity. If difficulties in determining correspondences occur, the spots projected in pattern X can be spaced further from one another in fourth process block 204 in order to reduce ambiguity in determining the correspondences. In said embodiment involving the variation in intensities, the low-intensity spots can be filtered out or at least reduced by reducing exposure times and/or by reducing the total output of projector 121. Only the high-intensity spots (which have greater spacing) are visible in the cameras 111, 112, which reduces ambiguity when determining correspondences.

Figure 15:
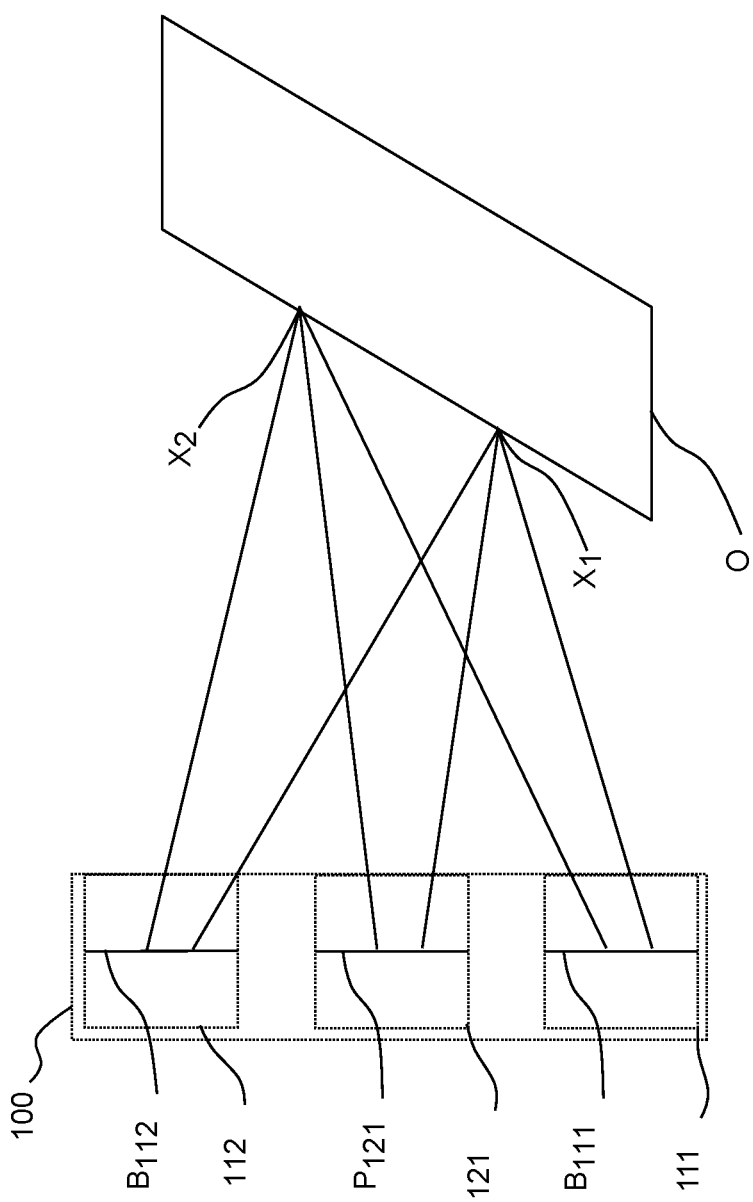
Figure 16:
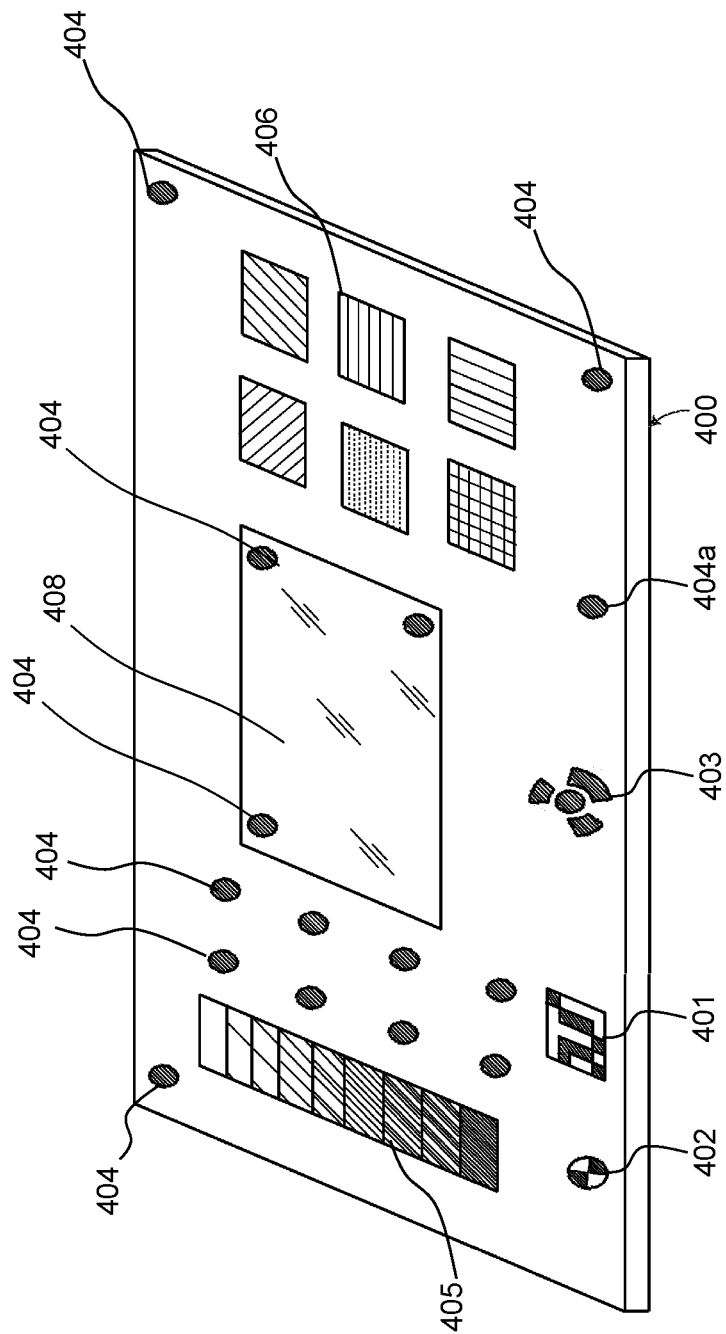

To determine the calibration parameters fully and accurately, it is helpful to use the entire volume around the 3D measurement device 100, particularly the depth information, in determining the extrinsic parameters. By way of example, FIG. 15 (schematically) shows how the relative geometry of the two cameras 111 and 112 is checked. For this purpose, two points X1, X2 which are spaced different distances from 3D measurement device 100 (i.e. different depths) are selected. A check may be performed using each of points X1 and X2 based on the previous calibration, or cameras 111 and 112 are still providing consistent results. If an inconsistency resulting from a deviation in the relative distance or the relative alignment of the two cameras 111 and 112 is found, the two different distances can be used to distinguish between the two types of errors, and the calibration can be corrected. Due to the high mechanical and thermal stability of support structure 102, bending of 3D measurement device 100 caused by thermal conditions or mechanical shock is rare, but may occur in the suspensions of cameras 111, 112, 113 and projector 121. In most cases it is sufficient to perform a calibration check when switching the unit on and at regular, extended intervals, for example after every twenty to one hundred images, which are then checked for deviations by means of low-pass filtering.

In the above, the checking of calibration parameters by searching for inconsistencies, in particular deviations in the positions of images of selected points from the expected positions, has been described. This check can be performed on a routine basis, for example, when 3D measurement device 100 is in use. The check permits at least a qualitative determination as to whether the calibration parameters require correction.

Both for an initial calibration and for recalibration, which is performed routinely or when inconsistencies are identified and calibration parameters require correction, an external calibration object may be used in principle, according to one embodiment, a calibration plate 400, as described below and illustrated in FIG. 14.

Calibration plate 400 is made, for example, of a carbon fiber reinforced plastic (CFRP), or a carbon fiber reinforced ceramic or a glass fiber reinforced plastic, for example. This material makes calibration plate 400 mechanically and thermally stable whilst keeping it lightweight. Calibration plate 400 may be rectangular in shape, i.e. a cuboid having two longer sides and a substantially shorter third side. Other shapes are also possible however. Calibration plate 400 may be positioned in the environment of 3D measurement device 100, for example, it may be leaned against a wall. Alternatively, calibration plate 400 may be provided with its own stand. On the side facing the 3D measurement device, calibration plate 400 has various marks, codes or generally textures, and is otherwise may be white.

In one embodiment, calibration plate 400 has an information code 401, for example, a QR code. Information code 401 can be recorded by cameras 111, 112, 113 or by some other recording device (such as a smartphone). Information code 401 contains information relating to calibration plate 400, in particular plate-specific calibration information or storage location particulars ("links") to this information, so that once information code 401 has been interpreted, this information can be retrieved. Such information may include the precise positions of the marks, codes and other elements on calibration plate 400. The information may relate to any irregularities or other characteristics of calibration plate 400 or the elements disposed thereon.

The marks used may be checkerboard marks 402, encoded point marks 403, uncoded point marks 404 or retroreflective point marks 404a. Checkerboard mark 402 consists, for example, of a circle divided into four sections, which are alternatingly black and white. Encoded point marks 403 can each have, for example, a central black-filled circle surrounded by separate black ring segments. Uncoded point marks 404 may each be a black-filled circle, for example. At least one example of each type of mark is may be provided.

Further, calibration plate 400 may have a gray scale 405 and a color palette 406. Gray scale 405 is an elongated strip containing a steady progression of gray shades between the brightness values for black and white. The gray shades may be applied in a continuous strip or in discrete fields. Color palette 406 contains multiple areas of different colors (for example red, green, blue, yellow, cyan, magenta), arranged in the form of tiles or a color wheel. The term "gray scale" is also meant to include an arrangement of gray shades in the form of a color wheel. In an embodiment, calibration plate 400 also has a mirror 408. Mirror 408 may be a metallic surface with or without a glass cover. To maintain a constant thickness of calibration plate 400, mirror 408 may be positioned within a slight indentation. At least one mark, for example, three uncoded point marks 404, may be applied to mirror 408.

The positions of the various marks, codes and other textures on the white calibration plate 400 are freely selectable, in principle. For instance, mirror 408 may be arranged centrally, with gray scale 405 and color palette 406 being positioned along two opposing edge regions, for example. Between these or along a third edge region, a field containing uncoded point marks 404 may be provided. Information code 401, checkerboard mark 402, encoded point mark 403 and retroreflective point marks 404a may be arranged along the free edge regions. To clearly identify the orientation of calibration plate 400 in the plane perpendicular to the viewing direction, only three of the four corners of calibration plate 400, for example, or of mirror 408, are provided with marks, for example uncoded point marks 404, while the fourth corner remains free, as is standard with QR code.

Using such a calibration plate 400, at least some of the intrinsic parameters (focal length, distortion, etc.) and extrinsic parameters (position and alignment) of cameras 111, 112, 113 and some of the extrinsic parameters of projector 121 can be determined. Each mark 402, 403, 404, 404a along with information code 401 can be recorded by cameras 111, 112, 113 and can be clearly identified (by control and evaluation device 122) in the recorded images, and in the case of information code 401 can also be interpreted. Multiple calibration parameters of cameras 111, 112, 113 can thus be determined and checked. Projector 121 also projects pattern X onto calibration plate 400. For selected points X1, X2 on pattern X, the three-dimensional coordinates for each of various distances between projector 121 and calibration plate 400 are measured. Using marks 402, 403, 404, 404a, the position and alignment (a total of six degrees of freedom) of calibration plate 400 relative to 3D measurement device 100 can be precisely determined. This allows the correspondences between the projections of points X1, X2 of pattern X in the image planes of cameras 111, 112, 113 to be uniquely determined. And as a result, the 3D coordinates of points X1, X2 on pattern X can be determined by triangulation, allowing said pattern X to be measured throughout the entire space by varying the distances between calibration plate 400 and projector 121. Multiple calibration parameters for projector 121 can thereby be determined and/or checked. Using gray scale 405 and color palette 406, a brightness adjustment and color measurement, in particular a white balance, are also possible.

Figure 17:
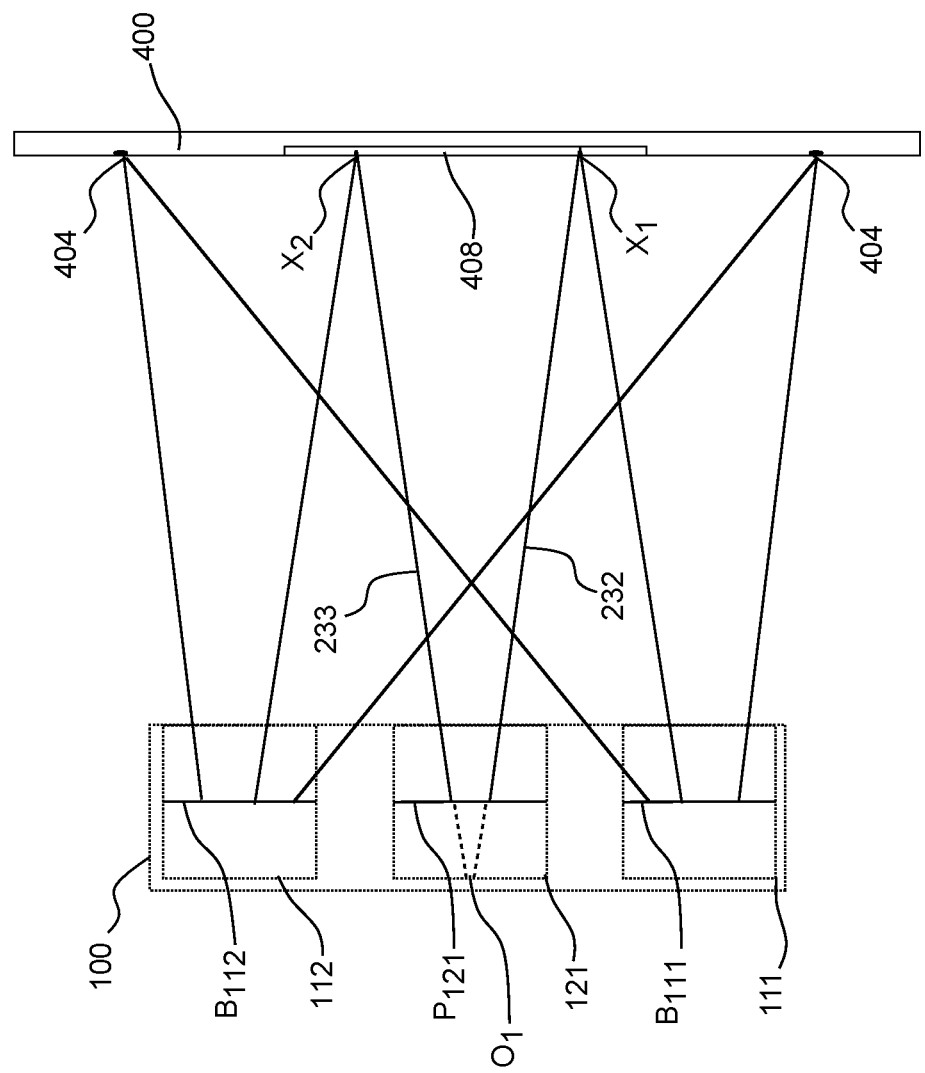

Mirror 408 on calibration plate 400 can be used to determine projection center O1 of projector 121, as illustrated schematically in FIG. 17. By way of example, a beam 232 from projector 121 is reflected at a point X1 on mirror 408 and then falls—depending on the arrangement—directly into camera 111, for example. Another incident beam 233 is reflected at a point X2 on mirror 408 and then falls directly into camera 112. When the three-dimensional coordinates of the plane of calibration plate 400 and thus of mirror 408 are measured (relative to 3D measurement device 100), for example using marks 402, 403, 404, 404*a*, the reflection points X1, X2 of beams 232, 233 of projector 121 can be converted to true positions and alignments relative to cameras 111, 112, 113. Projection center O1 of projector 121 is located at the point where the beams emitted by projector 121 intersect. The 2D camera 113 is able to see the position of projector 121 directly, regardless of whether an infrared filter is used, since the signal from a direct reflection is much stronger than one from a diffuse scattering, so that typically an adequate signal passes through the infrared filter.

When checking calibration parameters, calibration plate 400 is customarily placed in various positions relative to the 3D measurement device. Once the calibration parameters have been checked, the previous calibration parameters are adjusted where necessary. As part of an optimization strategy, for example, the calibration parameters are adjusted until the measurement results for marks 402, 403, 404, 404*a* and textures of calibration plate 400 match their known characteristics, which can be retrieved using information code 401.

Rather than sporadically recording a single 2D image, 2D camera 113 may record 2D images on an ongoing basis, which (when strung together) produce a current video image VL (live video image).

Display 130 shown in FIG. 7 provides, in an exemplary mode, a split screen, i.e., display 130 is divided into a first display part 130*a* and a second display part 130*b*. In the present embodiment, first display part 130*a* forms a (rectangular) central part of display 130, and second display part 130*b* forms a border area around first display part 130*a*. In another embodiment, the two display parts may be in the form of columns. In first display part 130*a*, the live video image VL generated by 2D camera 113 is displayed. In second display part 130*b*, the current 3D scan (or the most recently registered 3D scan) is displayed as a view of the three-dimensional point cloud 3DP (or a part of said cloud). The size of the first display part 130*a* is variable, and second display part 130*b* is always the area between first display part 130*a* and the edge of display 130. The live video image VL changes when 3D measurement device 100 is moved. The view of the three-dimensional point cloud 3DP changes accordingly, and may be adjusted to be viewed from the new position and alignment of 3D measurement device 100 once it has been moved.

The first display part 130*a*, i.e. video image VL, and the second display part 130*b*, i.e. the view of a portion of the three-dimensional point cloud 3DP, may be adjusted continuously (with respect to the content being displayed) so that they match one another. First, said part of the three-dimensional point cloud 3DP is selected (by control and evaluation device 122) as it is viewed from the perspective of 2D camera 113, or at least from a position aligned flush with 2D camera 113. Second, said part is selected such that it connects continuously with video image VL, i.e., the continuation of video image VL beyond the field of view of 2D camera 113 toward the left, right, top and bottom is shown. The display may be equivalent to that of a fisheye lens, but may be undistorted. The part of the three-dimensional point cloud 3DP covered by video image VL is not displayed. However, in order to indicate the density of the points of the three-dimensional point cloud 3DP there, video image VL, which is ordinarily displayed in natural colors, may be artificially colored, for example using an overlay. The artificial color (and optionally intensity) that is used to display the artificially colored video image VL corresponds to the density of the points, for example green for a (sufficiently) high density and yellow for a medium or low density (in need of improvement).

To facilitate registration, marks 133 that indicate recognizable structures (i.e. potential targets) may be inserted into the live video image VL in the first display part 130. Marks 133 may be small "x" or "+" symbols. The recognizable structures may be specific points, corners, edges or textures. The recognizable structures are identified by subjecting the current 3D scan or the live video image VL to the start of the registration process (i.e. the localization of targets). Using the live video image VL offers the advantage that a less frequent recording of images is required. If marks 133 are high density, a successful registration of the 3D scan in question can be expected. If a low density of marks 133 is detected, however, additional 3D scans and/or a slower movement of 3D measurement device 100 will be advantageous. The density of marks 133 is therefore a qualitative measure of the success of registration. The same is true of the density of the points of the three-dimensional point cloud 3DP, displayed by artificially coloring the video image VL.

The movement of 3D measurement device 100 and the processing of the recorded images may also be handled as tracking, in which case 3D measurement device 100 follows the relative movement of its environment by methods used in tracking. If the tracking is lost, for example by 3D measurement device 100 being moved too quickly, tracking can be easily re-established. To do so, the live video image VL supplied by 2D camera 113 and the last still-frame tracking image supplied by said camera are displayed to the user side-by-side (or one on top of the other). The user must then move 3D measurement device 100 until the two video images coincide. Acoustic or optical support, for example, based on a processing and comparison of the video images, is useful and therefore may be implemented.

Movement of 3D measurement device 100 based on gestures by the user may also be used for controlling the display of the video image VL and/or the three-dimensional point cloud (3DP). In particular, the scale of the representation of the video image VL and/or the three-dimensional point cloud 3DP on display 130 may be dependent on the speed and/or acceleration of the movement of 3D measurement device 100. The term "scale" is defined as the ratio between the size (either linear dimension or area) of the video image VL and the size (either linear dimension or area) of display 130, and is indicated as a percentage.

A small field of view of 2D camera 113 is associated with a small scale. In the present embodiment having a divided display, with a central first display part 130*a* displaying the video image VL, the first display part 130*a* is then smaller than in the standard case, and the second display part 130*b* shows a larger part of the three-dimensional point cloud 3DP. A large field of view is associated with a large scale. Video image VL can even fill the entire display 130.

The evaluation of the coordinates of the positions occupied by 3D measurement device 100 during the measurement process along the path of movement through space may also be used to determine the type of scene and, if appropriate, to offer different representations or control options. For instance, a path of movement around a center (particularly with 3D measurement device 100 aligned inward) indicates a recording of a single object O (object-centered recording), whereas a path of movement with 3D measurement device 100 aligned outward from the movement path (and particularly longer straight sections of the movement path) indicates a recording of spaces. It is therefore expedient, when spaces are being recorded, to (also) show a layout view (view from the top) as a map on display 130.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A calibration plate for calibrating a 3D measurement device that emits beams and has at least one camera, the calibration plate comprising:
a planar body having a surface;
a plurality of marks arranged on the surface, the plurality of marks configured to be recorded by the camera and can be identified in the resulting recorded images during operation of the 3D measurement device; and
a mirror is positioned on the surface that reflects incident beams from the 3D measurement device, wherein three of the plurality of marks are positioned on three of four corners of the mirror,
further comprising a gray scale element and a color palette element each positioned on the surface and disposed adjacent opposing edge regions of the mirror.

2. The calibration plate of claim 1, wherein the gray scale element is configured to be recorded by the camera and can be identified in the resulting recorded images during operation of the 3D measurement device.

3. The calibration plate of claim 1, wherein the color palette element is configured to be recorded by the camera and can be identified in the resulting recorded images during operation of the 3D measurement device.

4. The calibration plate of claim 1, further comprising an information code element positioned on the surface, wherein the information code element is a machine readable symbol.

5. The calibration plate of claim 4, wherein the information code element is configured to be recorded by the camera and can be identified in the resulting recorded images during operation of the 3D measurement device.

6. The calibration plate of claim 5, further comprising a recording device having a second camera and operable to record an image of the information code element.

7. The calibration plate of claim 5, wherein the information code element includes information relating to the calibration plate or storage location of particulars for the information.

8. The calibration plate of claim 7, wherein the information includes to the positions of each of the plurality of marks, the information code element, the gray scale element, the color palette element on the surface.

9. The calibration plate of claim 8 wherein the information includes information about any irregularities or other characteristics of the calibration plate.

10. A method for calibrating a 3D measurement device using a calibration plate, the method comprising:
positioning the calibration plate in an environment of the 3D measurement device, the 3D measurement device having at least one camera and a projector;
recording the calibration plate with the at least one camera;
determining the position and alignment of the calibration plate relative to the 3D measurement device using at least one of a plurality of marks formed on a surface of the calibration plate, wherein three of the plurality of marks are positioned on three of four corners of the mirror;
emitting with the projector at least one beam of light onto a mirror positioned on the surface, wherein the at least one of the plurality of marks is positioned on the mirror;
reflecting the first beam of light with the mirror into the at least one camera, wherein the at least one of the plurality of marks is positioned on the mirror; and
recording with the at least one camera at least one of a gray scale element or a color palette, wherein the gray scale element is positioned on the surface and disposed adjacent a first edge region of the mirror and the color palette element is positioned on the surface and disposed adjacent an opposing second edge region of the mirror.

11. The method of claim 10, further comprising generating at least one pattern on the calibration plate with the projector and recording images of the at least one pattern on the calibration plate with the at least one camera.

12. The method of claim 11, further comprising determining calibration parameters for the 3D measurement device from the images of the at least one pattern on the calibration plate.

13. The method of claim 12, wherein the at least one camera includes a first camera and a second camera.

14. The method of claim 13, wherein:
the first camera and the second camera record images, in their respective image planes of the pattern (X) on the calibration plate;
the at least one pattern is an uncoded pattern and is generated by the projector that defines a projector plane;
the projector, the first camera, and the second camera are arranged in a triangular configuration relative to one another; and
the projector, the first camera, and second camera define different epipolar lines in the projector plane and in the two image planes with points of the pattern.

15. The method of claim 14, further comprising:
defining between the first camera, second camera and projector two stereo geometries;

generating a three-part relationships of points and epipolar lines, from which the correspondences of the images of the pattern in the two image planes can be determined; and determining three-dimensional coordinates of the points on the surface of the calibration plate by triangulation based on the determined correspondences of the images of the at least one pattern.

16. The method of claim 10, further comprising:

recording an information code element positioned on the surface with the at least one camera; and retrieving information relating to the calibration plate based at least in part on the information code element.

17. The method of claim 10, wherein the gray scale element is an elongated strip of progressive shades of gray between brightness values associated with black and white.

* * * * *